United States Patent
Wu et al.

(10) Patent No.: US 8,010,315 B2
(45) Date of Patent: Aug. 30, 2011

(54) MULTI-MODALITY INSPECTION METHOD WITH DATA VALIDATION AND DATA FUSION

(75) Inventors: Yanyan Wu, Schenectady, NY (US); Francis Howard Little, Cincinnati, OH (US); Prabhjot Singh, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 945 days.

(21) Appl. No.: 11/945,456

(22) Filed: Nov. 27, 2007

(65) Prior Publication Data
US 2009/0136114 A1    May 28, 2009

(51) Int. Cl.
G01C 9/00      (2006.01)
G01N 21/00     (2006.01)

(52) U.S. Cl. ......... 702/152; 702/150; 356/237.2; 356/237.1; 356/239.7; 382/152; 382/154; 382/149

(58) Field of Classification Search ......... 356/237.1, 356/237.2, 239.7; 702/152, 150; 382/141–149, 382/152, 154
See application file for complete search history.

(56) References Cited

U.S. PATENT DOCUMENTS

| | | | |
|---|---|---|---|
| 4,437,151 A | 3/1984 | Hurt et al. | |
| 4,945,501 A | 7/1990 | Bell et al. | |
| 4,969,110 A | 11/1990 | Little et al. | |
| 5,283,822 A | 2/1994 | Little et al. | |
| 5,848,115 A | 12/1998 | Little et al. | |
| 6,341,453 B1 | 1/2002 | Cholley | |
| 6,356,069 B1 | 3/2002 | Trantow et al. | |
| 6,785,238 B1 | 8/2004 | Kago | |
| 7,065,176 B2 | 6/2006 | Moermond et al. | |
| 7,235,782 B2 | 6/2007 | Takane et al. | |
| 7,254,209 B2 | 8/2007 | Zhao et al. | |
| 7,272,254 B2 | 9/2007 | Shankarappa et al. | |
| 7,327,869 B2 * | 2/2008 | Boyer | 382/141 |
| 7,480,037 B2 * | 1/2009 | Palmateer et al. | 356/237.1 |
| 7,840,367 B2 * | 11/2010 | Little et al. | 702/95 |
| 2006/0156566 A1 | 7/2006 | Ingram et al. | |
| 2006/0219014 A1 | 10/2006 | Turner et al. | |
| 2007/0160282 A1 | 7/2007 | Nightingale et al. | |
| 2007/0217672 A1 | 9/2007 | Shannon et al. | |
| 2008/0137105 A1 | 6/2008 | Howard et al. | |

OTHER PUBLICATIONS

Office Action, U.S. Appl. No. 11/946,244, Apr. 15, 2010.
P. J. Zombo et al., "Advanced NDE systems for Flexible Operation and Maintenance of Gas Turbine Components," Power-Gen International 2006—Orlando, Florida, Nov. 28-30, 2006. http:/www.powergeneration.siemens.com/NR/rdonlyres/A20692F-FFD0-440B-838B-9D16FE8F8925/0/3__Advanced/NDE/Systems.pdf.

(Continued)

*Primary Examiner* — Layla Lauchman
(74) *Attorney, Agent, or Firm* — Penny A. Clarke (57) ABSTRACT

An inspection method is provided and includes acquiring at least one inspection data set. Each inspection data set comprises inspection data for a component. The inspection method further includes mapping the inspection data set onto a three-dimensional (3D) model of the component, to generate a 3D inspection model for the component, and validating the inspection data against the 3D model of the component using at least one validation criterion. A multi-modality inspection method is also provided and includes acquiring multiple inspection data sets corresponding to multiple inspection modalities for a component and fusing the inspection data sets to form a fused data set. The multi-modality inspection method further includes mapping the fused data set onto a 3D model of the component to generate a 3D multi-modality inspection model for the component.

21 Claims, 8 Drawing Sheets

OTHER PUBLICATIONS

Zhongguo Li et al., "A novel method for internal feature reconstruction based on Infrared thickness measurement," Third International Symposium on Multispectral Image Processing and Pattern Recognition, Proceedings of the SPIE, vol. 5286, pp. 230-237, 2003.

* cited by examiner

MULTI-MODALITY INSPECTION METHOD WITH DATA VALIDATION AND DATA FUSION

BACKGROUND

The invention relates generally to non-destructive evaluation (NDE) and more particularly, to fusing multi-modality NDE inspection data for a component onto a three-dimensional model of the component.

A variety of NDE inspection modalities are available to inspect industrial components, including infrared radiography (IR), ultrasound (UT) inspection, eddy current (EC) inspection, digital radiography, coordinate measuring machine (CMM), optical measurement and computed tomography (CT). Typically, the output of the NDE takes the form of a two dimensional (2D) image. However, the 2D NDE images are not readily comparable with three-dimensional (3D) models of the component under test. In addition, the 2D NDE images do not lend themselves to alignment of NDE data obtained using different NDE modalities.

Previous attempts to map NDE data onto a 3D model used reference geometries attaches to both the 3D model and to the component under test. However, the reference geometry may introduce inspection artifacts and noise, thereby reducing the inspection accuracy, such that the mapping process cannot be performed with a high enough degree of accuracy to satisfy the requirements of various inspection processes, for example the inspection of turbine blades. Moreover, it would be impractical to attach a reference geometry to every component under test.

It would therefore be desirable to provide an inspection method that maps NDE data onto a 3D model without the use of a reference geometry. It would also be desirable for the inspection method to fuse NDE data obtained using multiple NDE modalities onto the 3D model.

BRIEF DESCRIPTION

Briefly, one aspect of the present invention resides in an inspection method that comprises acquiring at least one inspection data set. Each inspection data set comprises inspection data for a component. The inspection method further comprises mapping the inspection data set onto a three-dimensional model of the component to generate a three-dimensional inspection model for the component. The inspection method further comprises validating the inspection data against the three-dimensional model of the component using at least one validation criterion.

Another aspect of the present invention resides in a multi-modality inspection method that comprises acquiring multiple inspection data sets corresponding to multiple inspection modalities for a component. The multi-modality inspection method further comprises fusing the inspection data sets to form a fused data set and mapping the fused data set onto a three-dimensional model of the component to generate a three-dimensional multi-modality inspection model for the component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
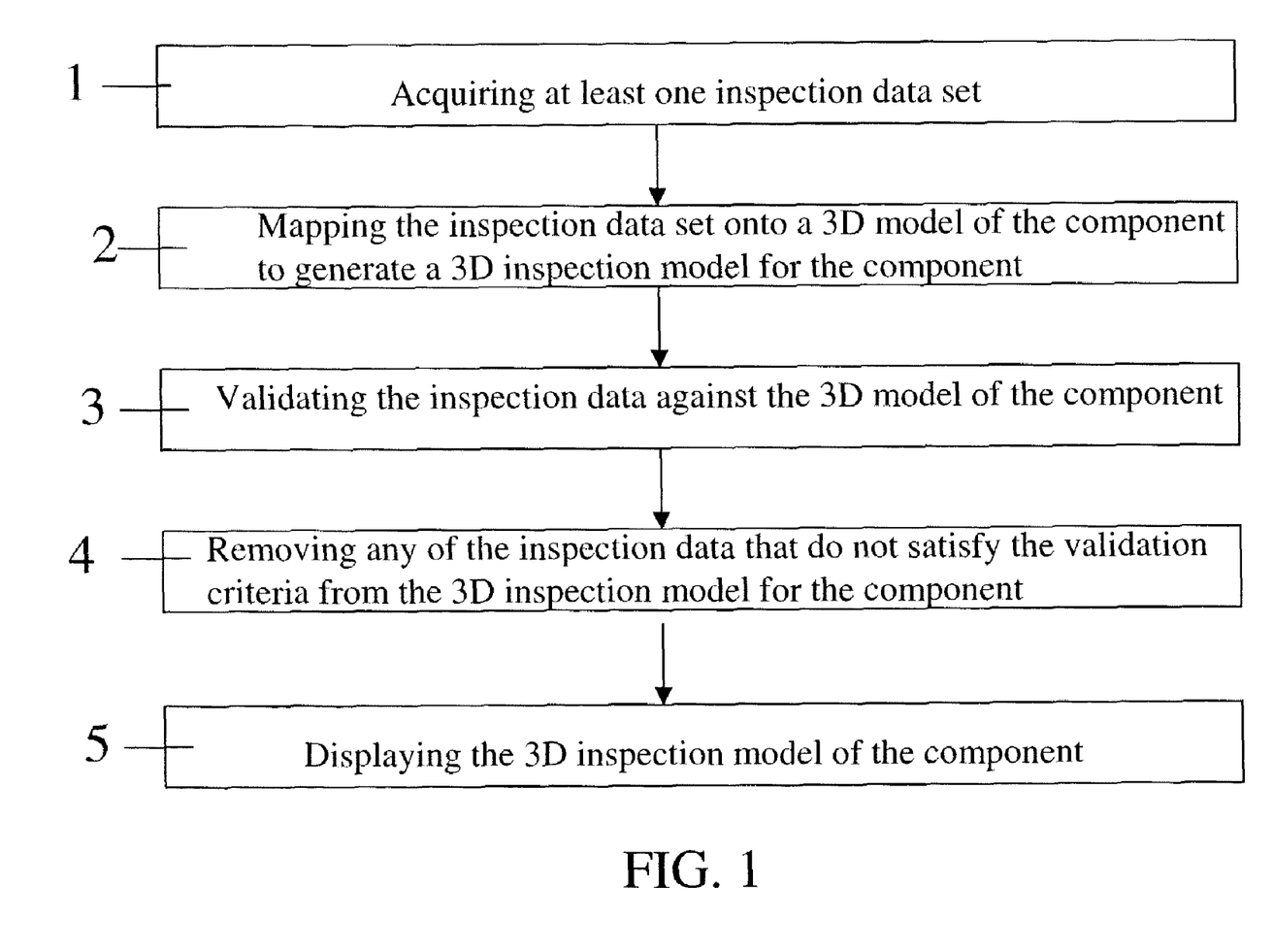
FIG. 1 is a process map for an inspection method embodiment of the invention.
Figure 4:
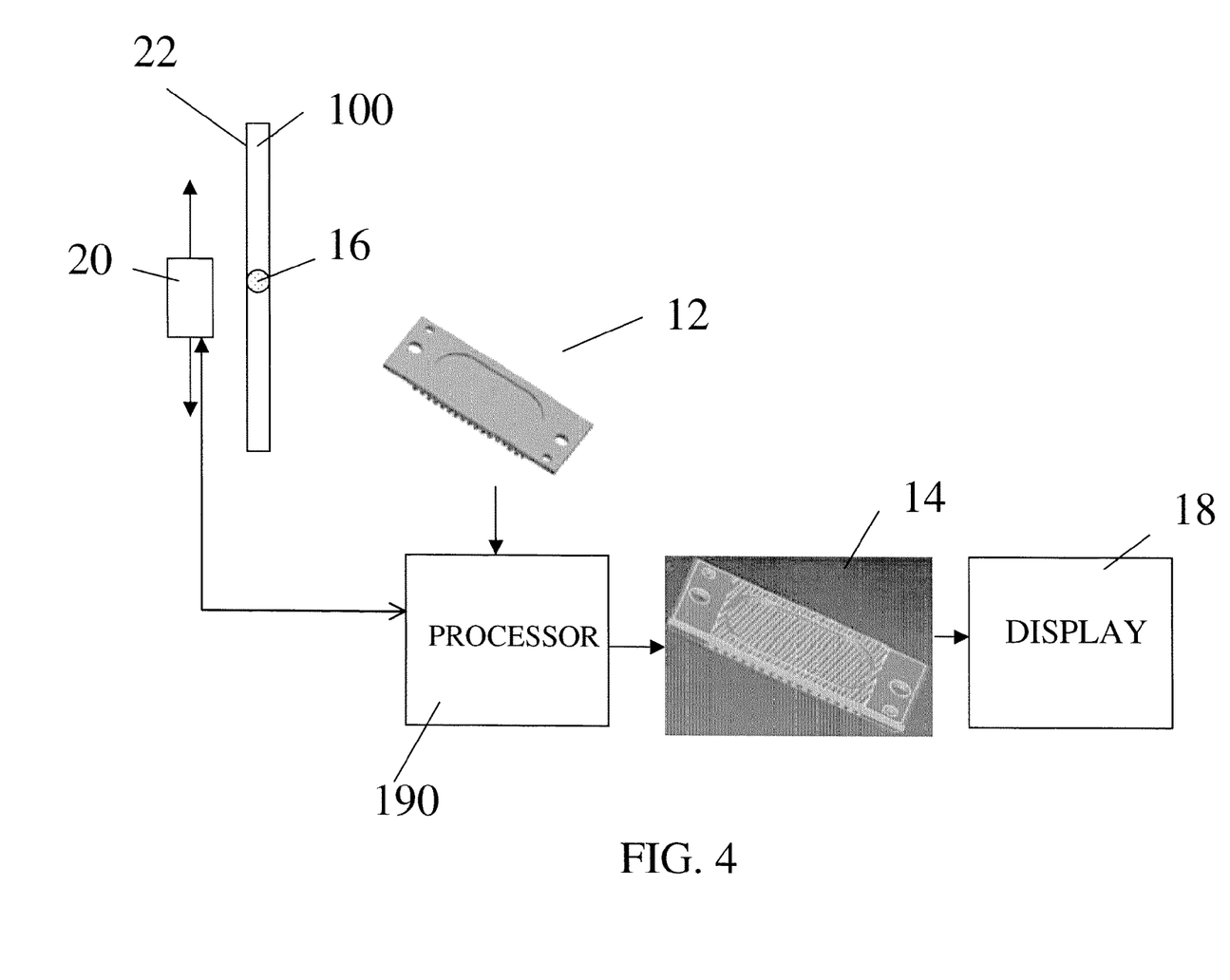
FIG. 4 schematically depicts an ultrasound inspection system for performing the inspection method of FIG. 1.

FIG. 1 illustrates an inspection method embodiment of the invention. As indicated in FIG. 1, the method includes at step 1, acquiring at least one inspection data set. Each inspection data set comprises inspection data for a component 10. A component 10 is schematically depicted in FIG. 4. Non-limiting examples of the component 10 include industrial parts, including but not limited to turbine airfoils, blades, disks, and shafts. The method further includes at step 2, mapping the inspection data set onto a three-dimensional model of the component to generate a three-dimensional inspection model 14 for the component. The method further includes at step 3, validating the inspection data against the three-dimensional model 12 of the component using at least one validation criterion.

According to a more particular embodiment, the three-dimensional model 12 comprises a solid computer aided design (CAD) model. In other examples, the 3D model 12 comprises a mesh model or a voxel model. Beneficially, a solid CAD model is more precise than a mesh model. For example, a solid CAD model contains the geometry information for the component, as well as information about the component's topology, such as vertices, edges, faces and neighboring information. Moreover, as solid CAD model can retain tolerance specifications and engineering requirements, whereas a mesh model cannot. Accordingly, the use of a solid CAD model facilitates the validation of inspection data against the CAD model using the tolerance specifications in the validation criteria.

According to a particular embodiment, the acquisition step 1 comprises acquiring at least one inspection data set for a local region 16 on the component 10. An example local region 16 is indicated in FIG. 4. For certain applications, it is desirable to inspect only a portion of a component. In other applications, it is desirable to inspect one or more portions of a component using one inspection modality and to inspect other portions of the component 10 using other inspection modalities. For example, thicker regions of a component might be inspected using ultrasound (UT), while thinner regions of the component might be inspected using infrared radiography (IR).

Figure 3:
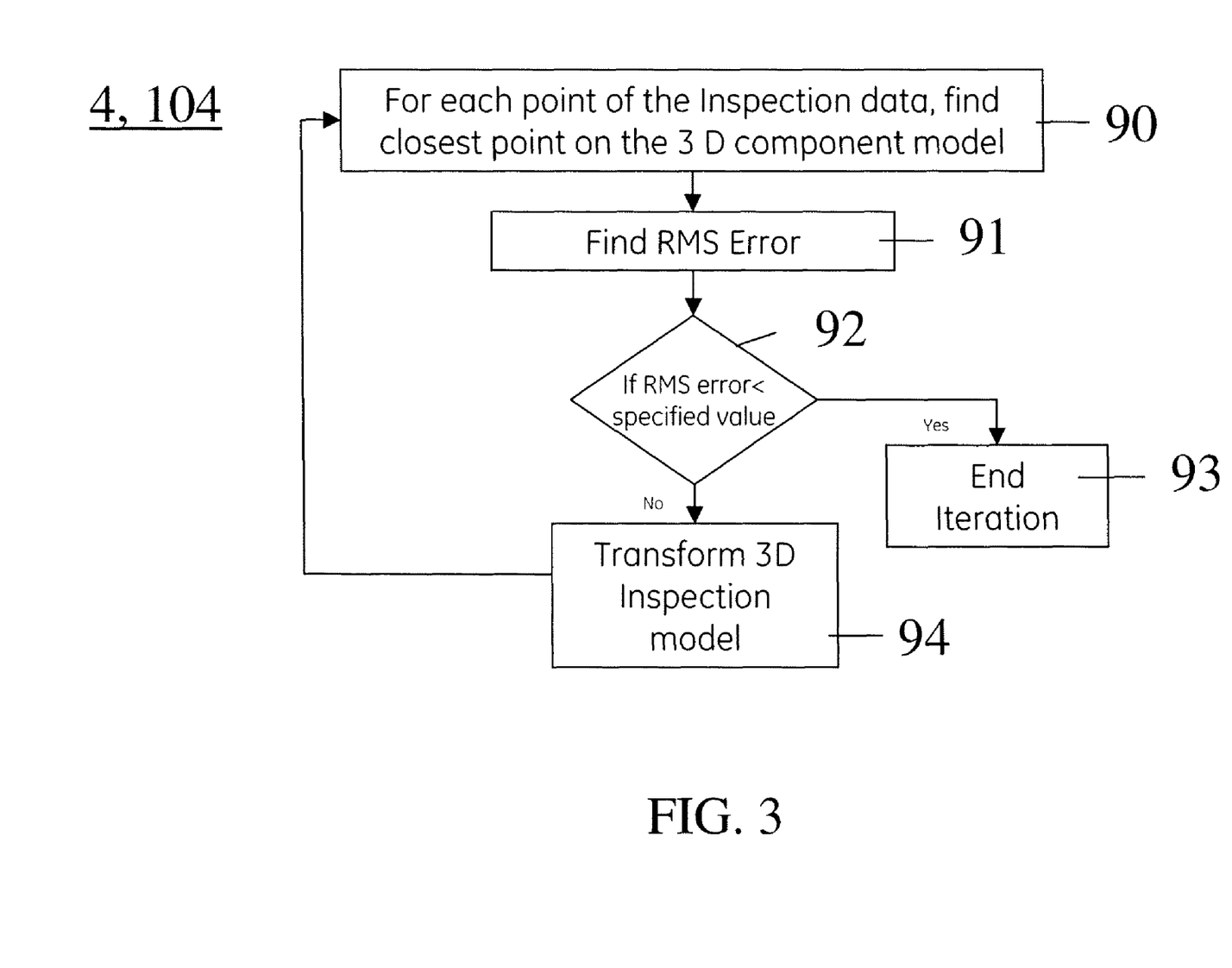
FIG. 3 is a process map for an example validation step for the inspection methods of FIG. 1 or 2.

For the embodiment illustrated in FIG. 1, the method includes at step 4, removing any of the inspection data that do not satisfy the validation criterion from the three-dimensional inspection model 14 for the component 10. FIG. 3 is a process map that illustrates one non-limiting example of validation step 4. As indicated in FIG. 3, the inspection data are validated by finding, at step 90, the closest point on the CAD model 12 for each inspection data point. At step 91, the root mean square (RMS) error is computed for each inspection data point relative to the nearest point on the three-dimensional model 12 of the component. At step 92, the RMS error for each of the inspection data points is compared to a specified value. As indicated in FIG. 3, if the RMS error exceeds a specified value, for example a tolerance specification for the component 10, the corresponding inspection data point is removed, at step 94, from the three-dimensional inspection model 14 for the component 10. If the validation criterion is satisfied, the iteration is terminated for that data point, at step 93. The requirement that the RMS error be less than a specified value is merely one example of a validation criterion, and other validation criteria may also be used, for example a validation method based on the mathematical definition of a geometric dimension and tolerance validation (GD& T).

There are a variety of applications for the resulting three-dimensional inspection model 14 for the component 10. As shown at step 5 in FIG. 1, the model 14 may be displayed, for example, on a monitor 18. A monitor 18 is schematically depicted in FIG. 4. In addition, the method may further include performing an engineering analysis, such as a finite element model (FEM) analysis, on the three-dimensional inspection model 14 for the component 10. In this manner, the three-dimensional inspection model 14 generated using the inspection method can be used to perform more accurate analyses on the component 10 to aid in engineering and design of improved components. In other example applications, the method further includes using the three-dimensional inspection model 14 for the component 10 to modify at least one of (a) a design of the component and (b) a manufacturing process for the component.

Figure 2:
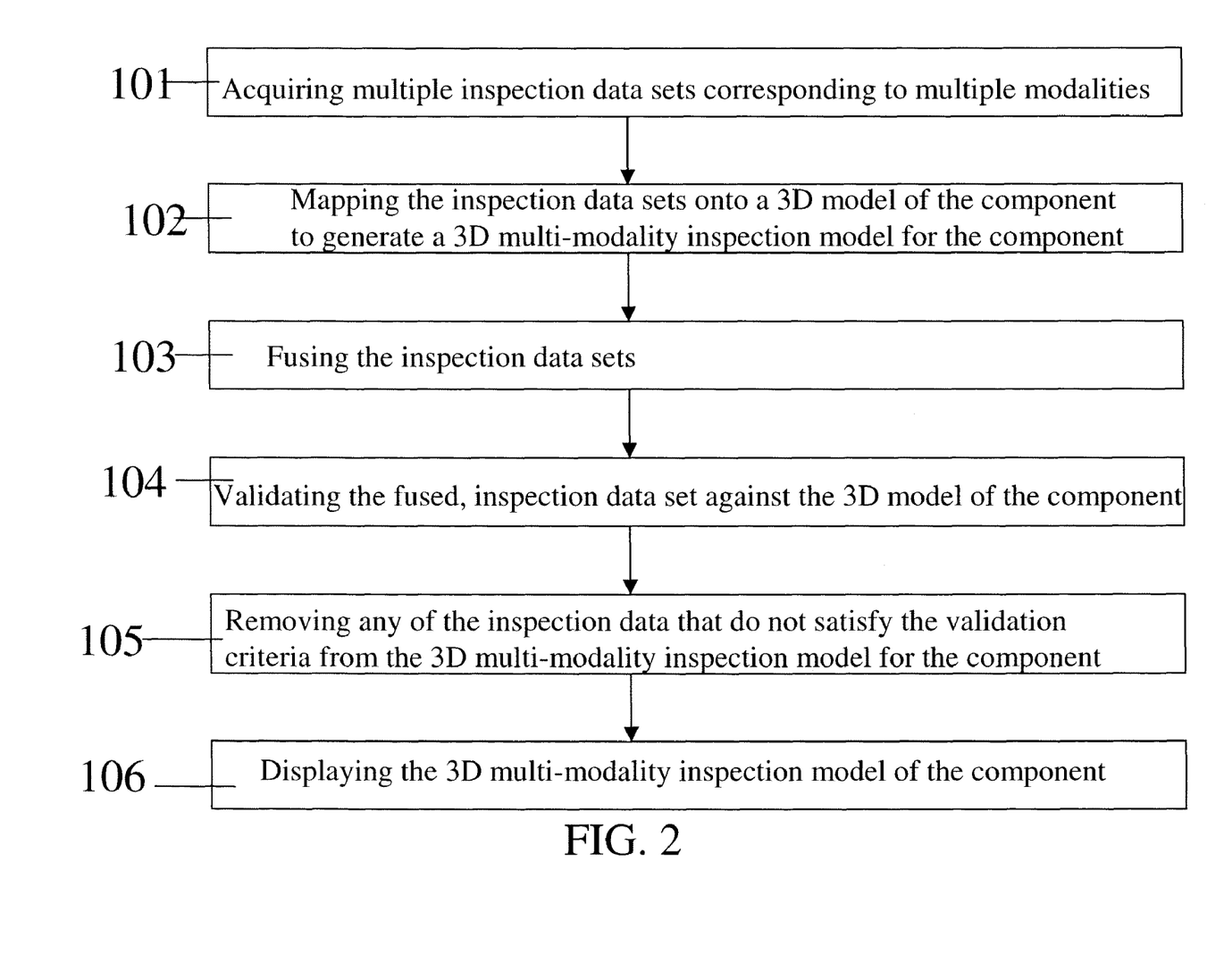
FIG. 2 is a process map for a multi-modality inspection method embodiment of the invention with data fusion.

The inspection method is applicable to a variety of inspection modalities, and in the particular example illustrated by FIG. 2, the acquiring step (step 101) comprises acquiring multiple inspection data sets corresponding to multiple inspection modalities. For this embodiment, the mapping step (step 102) comprises mapping each of the inspection data sets onto the three-dimensional model 12 of the component 10, and the three-dimensional inspection model 14 comprises a three-dimensional, multi-modality inspection model. For the multi-modality embodiment illustrated by FIG. 2, the method further includes at step 103 fusing the inspection data sets. In one example embodiment, the fusing step 103 comprises performing at least one statistical analysis on the inspection data sets to determine redundant data and removing the redundant data from the three-dimensional multi-modality inspection model based on the statistical analysis. In addition, and as discussed below, removal of redundant data can also be implemented based on the pre-knowledge of strengths of different inspection modalities. Although FIG. 2 indicates that the fusing step 103 is performed after the mapping step 102, the fusing step 103 may also be performed prior to the mapping step 102. Non-limiting examples of the statistical analysis include applying decision-making algorithms to determine the most accurate data. Non-limiting examples of decision-making algorithms include Bayesian Model and Neural Network algorithms. The most accurate data is retained in the fusing step 103 and forms a fused data set. In one non-limiting example, the fused data set is mapped onto the 3D model 12 to form the 3D multi-modality inspection model 14. In this manner, the redundant data is removed from the 3D inspection model. Beneficially, this approach can be applied in the absence of pre-knowledge about the relative accuracy of various inspection modalities.

In another example embodiment, the fusing step 103 comprises removing redundant data from one or more of the inspection data sets to form a fused data set, wherein the removal is based on the relative accuracy of respective ones of the inspection modalities. In one example, the mapping step 102 comprises mapping the fused data set onto the three-dimensional model 12 of the component 10 to form the three-dimensional, multi-modality inspection model 14 of the component. In other examples, the fusing step 103 is performed after the mapping step 102 (as indicated in FIG. 2). Beneficially, this approach leverages knowledge of the relative accuracy of the various inspection modalities. For example, when comparing computed tomography (CT) and coordinate measurement machine (CMM) data, one knows that CT data is typically more accurate for data corresponding to regions internal to the component ("internal data"), whereas CMM data is typically more accurate for data corresponding to the surface of the component ("external data"). For this example, external CMM data and internal CT would be selected for alignment onto the CAD model 12. In another example, when comparing ultrasound and infrared radiography (IR) data, ultrasound data is typically more accurate for thicker regions of the component, whereas IR typically provides more accurate data for thinner regions of the component. Thus, the ultrasound data for the thinner regions can be removed, as can the IR data for the thicker regions of the component. The remaining ultrasound data for the thicker regions and IR data for the thinner regions can then be fused with the CAD model 12. In a more complex example, CT data can be selected to construct the internal cavity information, IR data can be selected to construct the internal wall of a thin wall, and CMM data can be selected to construct the external boundary of the fused multimodal inspection model.

In addition to the acquiring, mapping and validating steps (101-103), the multi-modality inspection method embodiment illustrated by FIG. 2 further includes at step 104, validating the fused inspection data set against the 3D model 12 of the component. Further, the illustrated multi-modality inspection method further includes at step 105 removing, from the fused inspection data set, any of the inspection data that do not satisfy the validation criteria from the 3D multi-modality inspection model 14 for the component 10. As discussed above, the resulting 3D multi-modality inspection model 14 has a variety of applications, including for example, being displayed (as indicated at step 106 in FIG. 2).

Figure 5:
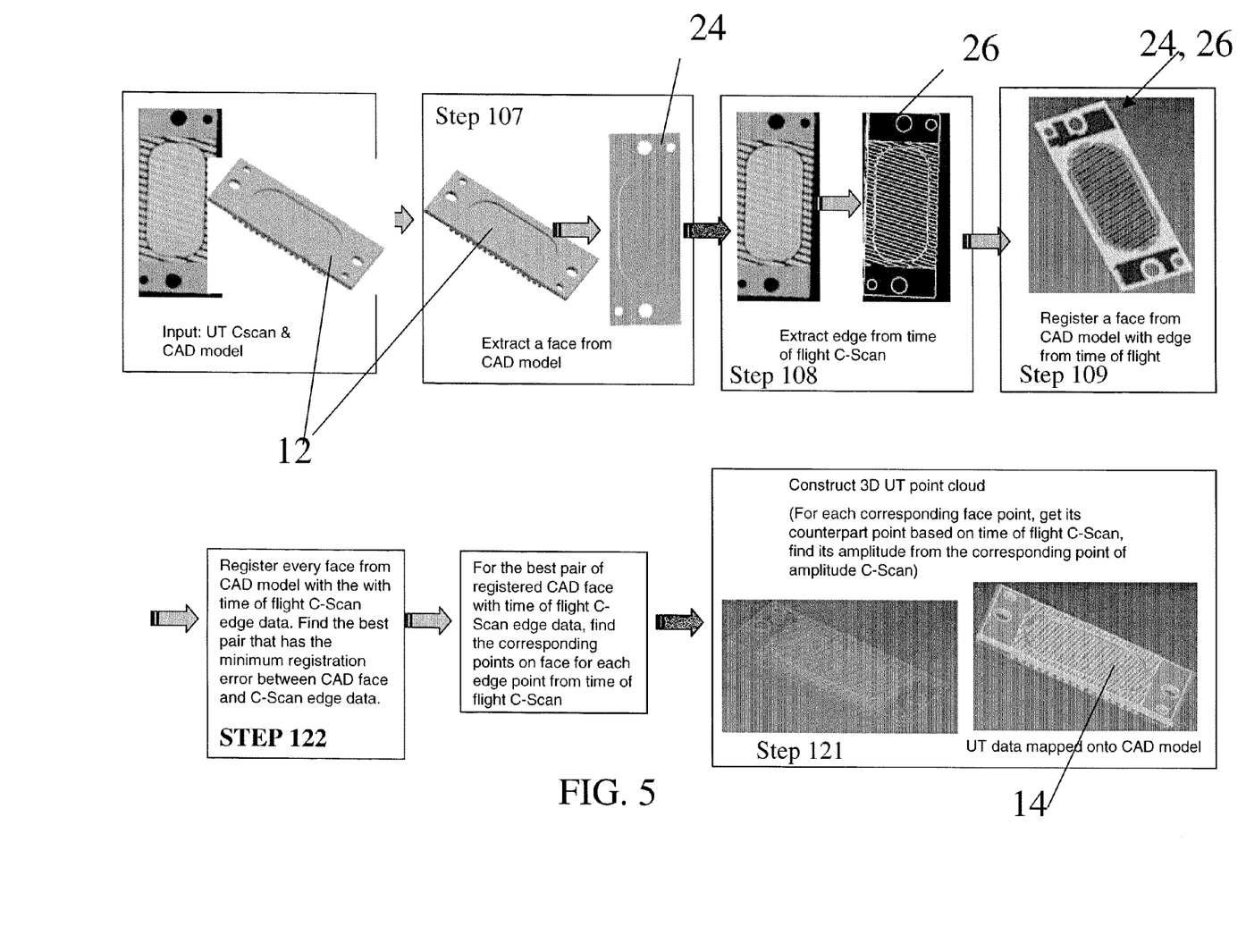
FIG. 5 illustrates a process for mapping ultrasound (UT) inspection data onto a three-dimensional model for a component.

As discussed above, the inspection method is applicable to different inspection modalities. FIGS. 4 and 5 illustrate one example, in which the inspection data set comprises ultrasound inspection data obtained by scanning an ultrasound transducer 20 relative to at least one surface 22 of the component. The ultrasound inspection data typically takes the form of a "c-scan," which is a colored ultrasound image, where color can correspond to component thickness. As shown for example in FIG. 4, the component 10 is inspected using an ultrasound (UT) transducer 20. The invention is not limited to any specific inspection modality, and UT is merely an illustrative example. The inspection data (a c-scan in this UT example) is input into a processor 190. A 3D solid CAD model 12 for the component is input into the processor 190, as shown. The processing steps are performed in the processor, which optionally outputs the 3D inspection model 14 to a display monitor 18 for display.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

For the example illustrated in FIG. 5, the mapping step 102 comprises identifying, on the three-dimensional model 12 of the component 10, the surface 22 relative to which the ultrasound transducer 20 moves. As shown in FIG. 5, the illustrated mapping step 102 further comprises, at step 107, extracting a face 24 from the three-dimensional model 12, where the face 24 corresponds to the identified surface 22. As used herein, a "face" 24 comprises a smoothly connected set of one or more surfaces of the three-dimensional model 12. The illustrated mapping step 102 further comprises, at step 108, extracting an edge 26 from the ultrasound inspection data (c-scan), and, registering the face 24 with the edge 26 at step 109. The registration can be performed using a variety of algorithms, one non-limiting example of which is an iterative closest point (ICP) technique. The mapping step 102 further comprises, at step 121, determining points on the face 24 corresponding to respective points on the edge 26 and using thickness data from the ultrasound inspection data to determine amplitudes for respective points on the face 24.

The previous example assumed that the surface 22 of the component 10, relative to which the transducer 20 was scanned, was known. In the event that this surface 22 is not known, the following modified process can be employed to perform the mapping step 102. For each face 24, steps 107-109 are repeated, as discussed above with reference to FIG. 5. Next, and as indicated in step 122, the face 24 with the least registration error is identified. The face having the minimum registration error with the edge data may be selected, for example, by performing a RMS (root mean square) error analysis on the edge and face data. The identified face 24 corresponds to the face 24 relative to which the ultrasound transducer 20 was scanned. The selected face is then used as a base face to map ultrasound thickness data onto the 3D geometry in step 121. Beneficially, this technique does not require prior knowledge of the surface 22 of the component 10 that was scanned.

Figure 6:
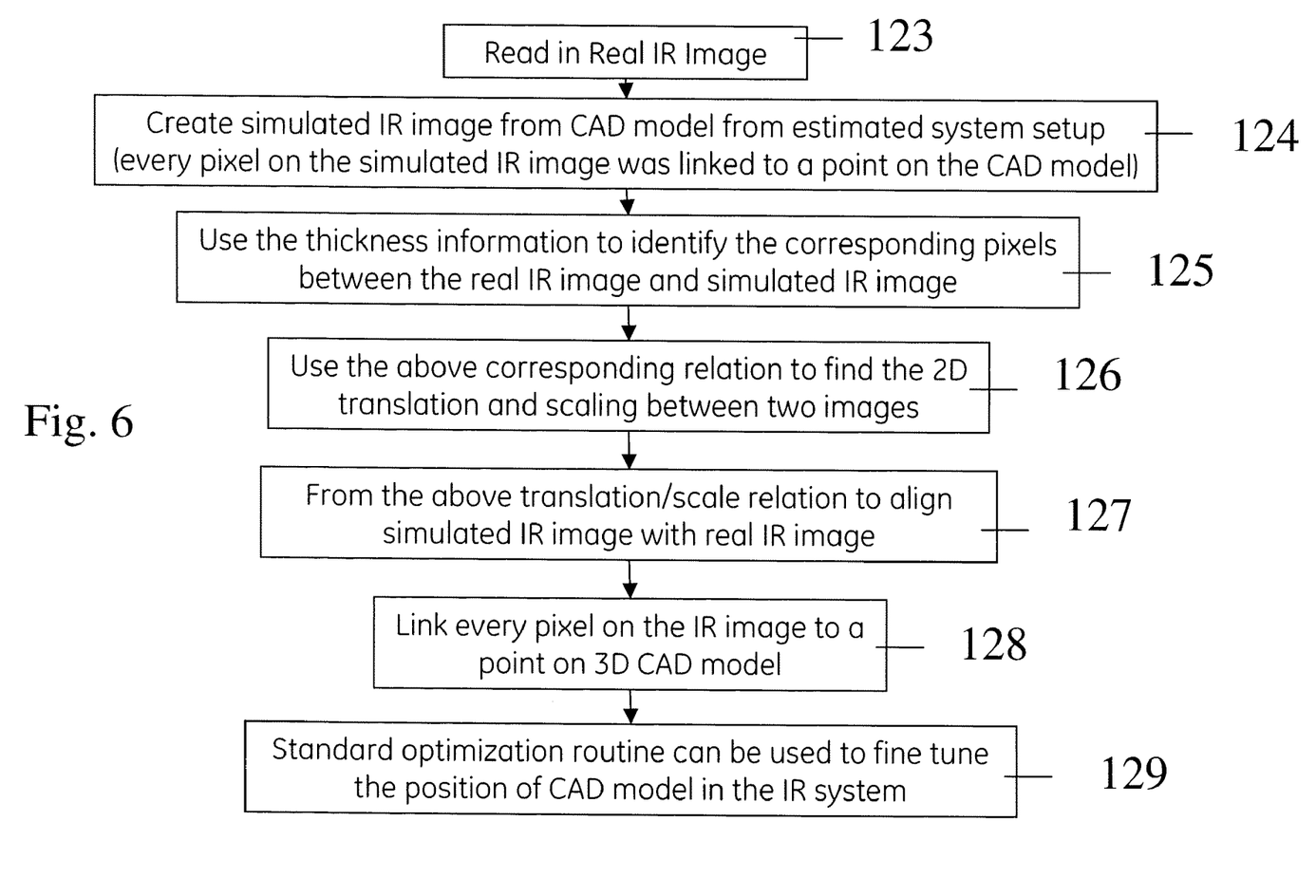
FIG. 6 illustrates a process for mapping infrared radiography (IR), eddy current (EC) or UT inspection data onto a three-dimensional model for a component.

Similarly, the inspection method can be applied to an infrared radiography (IR) image, which is obtained using an IR inspection system (not shown). IR inspection systems are known, and hence the details are not discussed here. 12. FIG. 6 shows a process map for applying the inspection method to IR data. As shown, for example in FIG. 6, the method includes, at step 123, acquiring an IR image. The method further includes, at step 124, creating a simulated IR image from the three-dimensional model 12 of the component 10. At step 125, thickness information obtained from the IR image and from the simulated IR image is used to identify corresponding pixels between the IR image and the simulated IR image. In particular, overlapping thickness information is used to identify corresponding pixels between the IR and simulated IR images. At step 126, a two-dimensional translation matrix (dx, dy) and a scaling factor S between the IR image and the simulated IR image are determined using the corresponding pixels. At step 127, the simulated IR image is aligned with the IR image using the two-dimensional translation matrix (dx, dy) and scaling factor S. At step 128, the pixels on the IR image are linked to respective points on the three-dimensional model 12 of the component 10. Optionally, at step 129, a standard optimization routine, such as a standard gradient-based optimization routine, can be used to fine-tune the position of the three-dimensional model in the IR system.

Moreover, the process shown in FIG. 6 is applicable to ultrasound (UT) inspection data. In this example, the inspection data set comprises an ultrasound image (c-scan). A real UT image is read into the processor at step 123. At step 124, the method further comprises creating a simulated UT image from the three-dimensional model 12 of the component 10. Steps 124-128 and optional step 129 are performed to align the simulated UT image with the ultrasound image and link the pixels on the UT image to respective points on the 3D model 12 of the component 10.

In addition, the process shown in FIG. 6 is applicable to eddy current (EC) inspection data. In this example, the inspection data set comprises an eddy current image. A real EC image is read into the processor at step 123. At step 124, the method further comprises creating a simulated EC image from the three-dimensional model 12 of the component 10. Steps 124-128 and optional step 129 are performed to align the simulated EC image with the EC image and link the pixels on the EC image to respective points on the 3D model 12 of the component 10.

Figure 7:
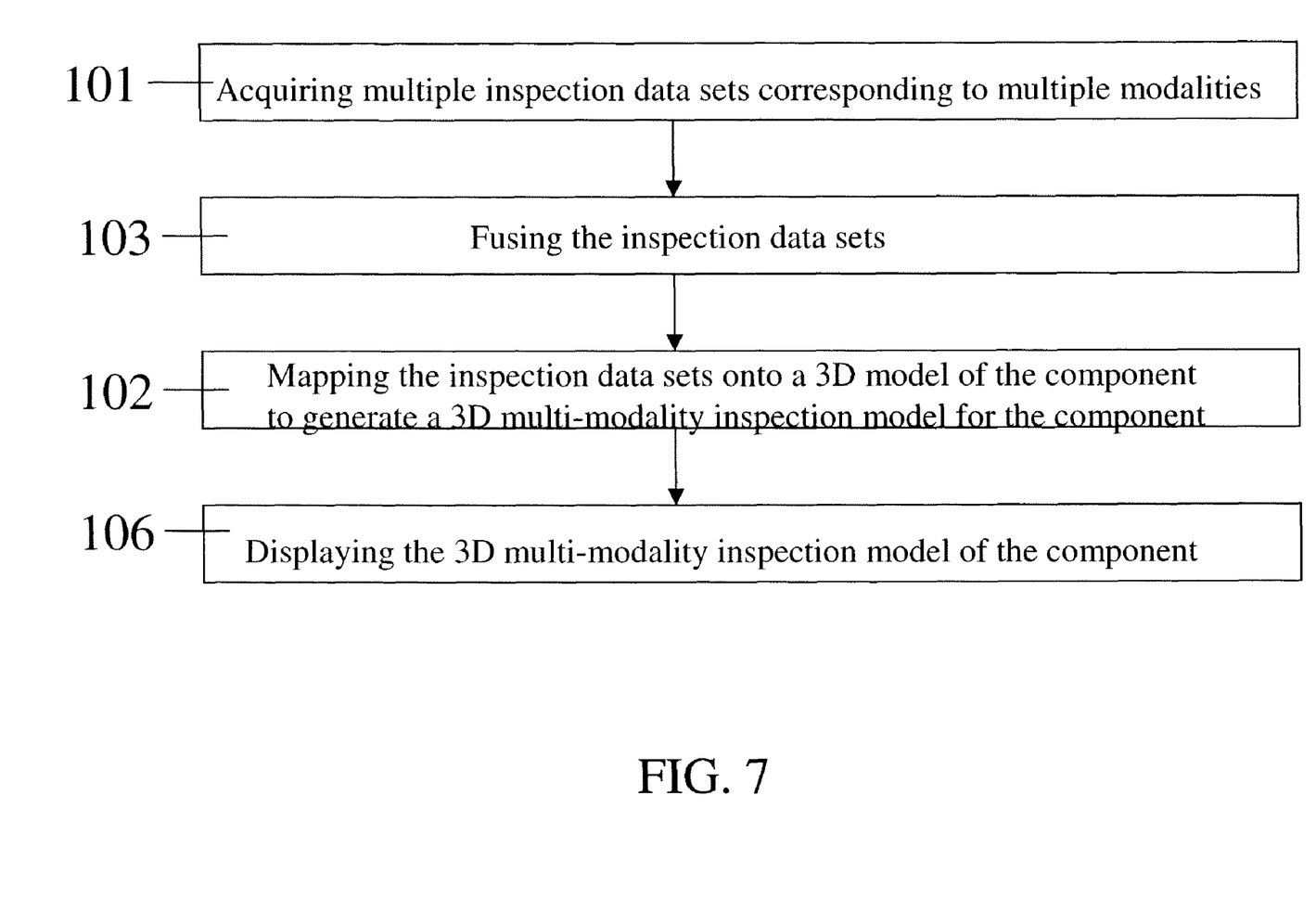
FIG. 7 is a process map for another multi-modality inspection method embodiment of the invention with data fusion.

FIG. 7 shows a process map for a multi-modality inspection method embodiment of the invention. As shown in FIG. 7, the multi-modality inspection method includes at step 101, acquiring multiple inspection data sets corresponding to multiple inspection modalities for a component 10. At step 103, the inspection data sets are fused to form a fused data set. At step 102, the fused data set is mapped onto a three-dimensional model 12 of the component to generate a three-dimensional multi-modality inspection model 14 for the component. According to a particular embodiment, the three-dimensional model 12 comprises a solid computer aided design (CAD) model.

Although FIG. 7 indicates that the fusing step 103 is performed before the mapping step 102, the fusing step 103 may also be performed after the mapping step 102. Example fusing steps are discussed above with reference to FIG. 2. In one particular embodiment, the fusing step comprises performing at least one statistical analysis on the inspection data sets to determine redundant data and removing the redundant data from the inspection data sets to form the fused data set. As noted above, this fusing technique does not require prior knowledge about the relative accuracies of the inspection modalities. Another particular embodiment leverages such prior knowledge. For this embodiment, the fusing step comprises removing redundant data from one or more of the inspection data sets to form the fused data set, wherein the removal is based on the relative accuracy of respective ones of the inspection modalities. As noted above, the data fusion 103 can also be performed after mapping step 102, in which case the redundant data is removed from the 3D inspection model 14. One benefit of the later approach is that geometry/engineering specification information on the CAD model can be used to assist inspection data fusion.

As indicated in FIG. 7, the method optionally further includes, at step 106, displaying the three-dimensional inspection model 14 for the component 10. For example, the three-dimensional inspection model 14 may be displayed on a monitor 18, as indicated in FIG. 4. Other sample applications of the resulting three-dimensional inspection model 14 include using the three-dimensional inspection model 14 for the component 10 to modify at least one of (a) a design of the component and (b) a manufacturing process for the component.

Figure 8:
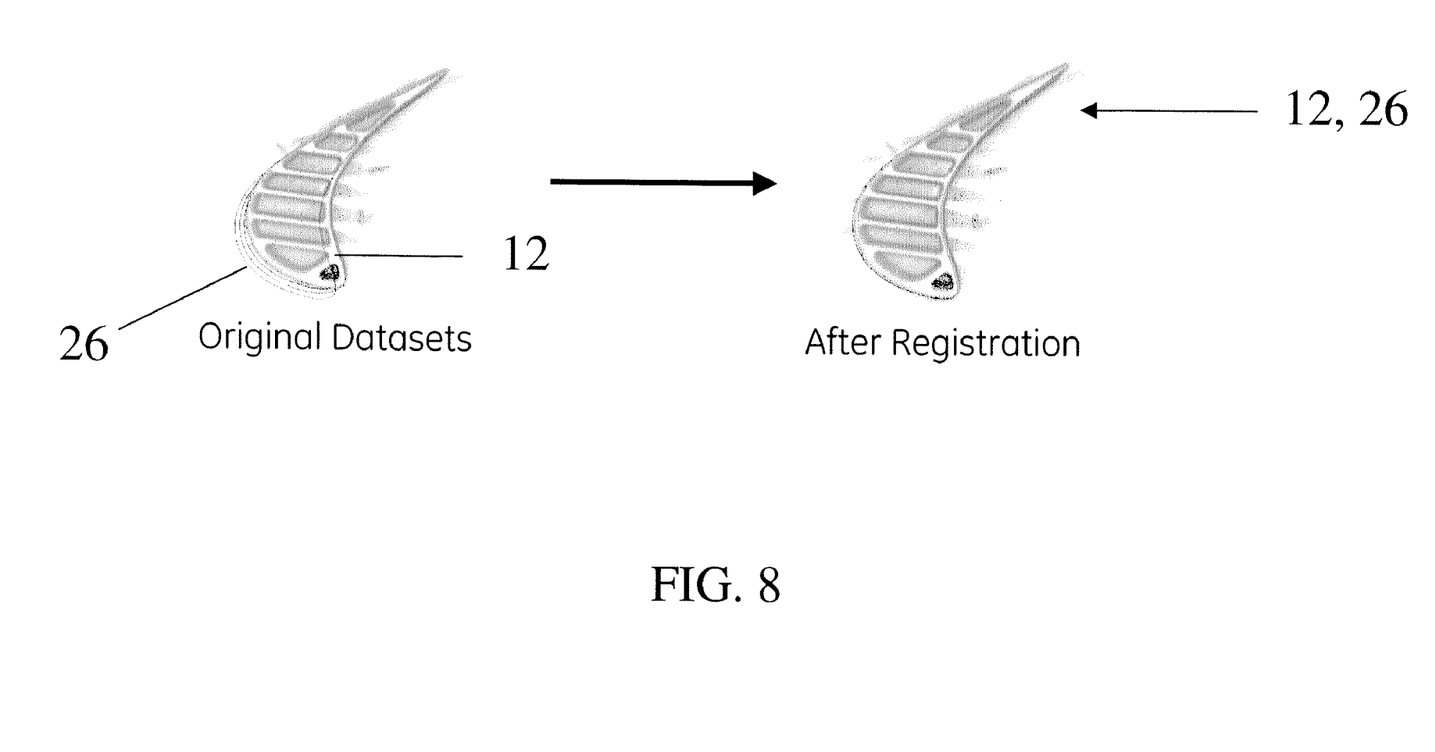
FIG. 8 shows the alignment of inspection data with a CAD model for a cross-section of a turbine blade.

Beneficially, the invention does not require the use of a reference geometry, in order to map inspection data onto the 3D CAD model with a high level of accuracy. FIG. 8 illustrates the registration between inspection data (indicated by edge data 26 in FIG. 8) and a solid CAD model 12 for a cross-section of a turbine blade 10. Prior to registration, the edge data 26 extracted from the NDE inspection data and the CAD model are not aligned, as indicated on the left hand side of FIG. 8. By applying the mapping processes discussed above with reference to FIGS. 5 and 6, the edge data 26 are aligned with the CAD model 12, as indicated on the right hand side of FIG. 8. As is clear from the processes illustrated by FIGS. 5 and 6, the mapping is achieved without the use of a reference geometry.

Other benefits of the invention include the fusion of multi-modality inspection data onto a solid 3D CAD model to form a 3D inspection model. In addition, redundant data can be removed using prior knowledge of the relative accuracies of the inspection modalities or based on statistical analysis. In this manner, the most relevant inspection data for the various inspection modalities is fused and mapped onto the solid CAD model, in order to improve overall inspection accuracy. Beneficially, the solid CAD model is more precise than a mesh model and can retain tolerance specifications and engineering requirements, whereas a mesh model cannot. In addition, the invention validates the inspection data against the three-dimensional model 12 of the component, in order to remove unreliable inspection data from the 3D inspection model. The resulting 3D inspection model can be displayed or used in engineering analyses. Further, the fused multi-modality inspection model can be used to study the strength of different modalities, the result of which can be used as a guideline for multimodal inspection planning, in order to improve overall inspection accuracy and inspection efficiency.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An inspection method comprising:
   acquiring at least one inspection data set, each of the inspection data sets comprising a plurality of inspection data for a component;
   mapping the inspection data set onto a three-dimensional model of the component to generate a three-dimensional inspection model for the component; and
   validating the inspection data against the three-dimensional model of the component using at least one validation criterion.

2. The inspection method of claim 1, further comprising removing any of the inspection data that do not satisfy the validation criterion from the three-dimensional inspection model for the component.

3. The inspection method of claim 1, wherein the acquiring step comprises acquiring a plurality of inspection data sets corresponding to a plurality of inspection modalities, wherein the mapping step comprises mapping each of the inspection data sets onto the three-dimensional model of the component, and wherein the three-dimensional inspection model comprises a three-dimensional, multi-modality inspection model.

4. The inspection method of claim 3, further comprising fusing the inspection data sets, wherein the fusing step comprises:
   performing at least one statistical analysis on the inspection data sets to determine a plurality of redundant data; and
   removing the redundant data from the three-dimensional multi-modality inspection model based on the statistical analysis.

5. The inspection method of claim 3, further comprising fusing the inspection data sets, wherein the fusing step comprises removing a plurality of redundant data from one or more of the inspection data sets to form a fused data set, wherein the removal is based on the relative accuracy of respective ones of the inspection modalities.

6. The inspection method of claim 1, further comprising displaying the three-dimensional inspection model for the component.

7. The inspection method of claim 1, further performing an engineering analysis on the three-dimensional inspection model for the component.

8. The inspection method of claim 1, wherein the acquiring step comprises acquiring at least one inspection data set for a local region on the component.

9. The inspection method of claim 1, further comprising using the three-dimensional inspection model for the component to modify at least one of (a) a design of the component and (b) a manufacturing process for the component.

10. The inspection data set of claim 1, wherein the inspection data set comprises ultrasound inspection data obtained by scanning an ultrasound transducer relative to at least one surface of the component, and wherein the mapping step comprises:
    identifying, on the three-dimensional model of the component, the surface (22) relative to which the ultrasound transducer moves;
    extracting a face from the three-dimensional model, wherein the face corresponds to the identified surface;
    extracting an edge from the ultrasound inspection data;
    registering the face with the edge;
    determining a plurality of points on the face corresponding to a respective plurality of points on the edge; and
    using a plurality of thickness data from the ultrasound inspection data to determine a plurality of amplitudes for respective points on the face.

11. The inspection data set of claim 1, wherein the inspection data set comprises ultrasound inspection data obtained by scanning an ultrasound transducer relative to at least one surface of the component, and wherein the mapping step comprises:
    extracting a face from the three-dimensional model, wherein the face corresponds to the identified surface;
    extracting an edge from the ultrasound inspection data;
    registering the face with the edge,
    wherein the face extraction and registration steps are repeated for every face from the three-dimensional model,
    selecting the face having a minimum registration error relative to the edge,
    determining a plurality of points on the selected face corresponding to a respective plurality of points on the edge; and
    using a plurality of thickness data from the ultrasound inspection data to determine a plurality of amplitudes for respective points on the face.

12. The inspection method of claim 1, wherein the inspection data set comprises an infrared radiography (IR) image, the method further comprising creating a simulated IR image from the three-dimensional model of the component, the mapping step comprising:

using a plurality of thickness information obtained from the IR image and from the simulated IR image to identify a plurality of corresponding pixels between the IR image and the simulated IR image, wherein the corresponding pixels are determined from overlapping thickness information for the IR image and simulated IR image;

determining a two-dimensional translation matrix (dx, dy) and a scaling factor S between the IR image and the simulated IR image, using the corresponding pixels;

aligning the simulated IR image with the IR image using the two dimensional translation matrix (dx, dy) and scaling factor S; and linking a plurality of pixels on the IR image to a respective plurality of points on the three-dimensional model of the component.

13. The inspection method of claim 1, wherein the inspection data set comprises an ultrasound image, the method further comprising creating a simulated ultrasound image from the three-dimensional model of the component, the mapping step comprising:

using a plurality of thickness information obtained from the ultrasound image and from the three-dimensional model of the component to identify a plurality of corresponding pixels between the ultrasound image and the simulated ultrasound image;

determining a two-dimensional translation matrix (dx, dy) and a scaling factor S between the ultrasound image and the simulated ultrasound image, using the corresponding pixels;

aligning the simulated ultrasound image with the ultrasound image using the two dimensional translation matrix (dx, dy) and scaling factor S; and linking a plurality of pixels on the ultrasound image to a respective plurality of points on the three-dimensional model of the component.

14. The inspection method of claim 1, wherein the inspection data set comprises an eddy current image, the method further comprising creating a simulated eddy current image from the three-dimensional model of the component, the mapping step comprising:

using a plurality of thickness information or surface crack obtained from the eddy current image and from the three-dimensional model of the component to identify a plurality of corresponding pixels between the eddy current image and the simulated eddy current image;

determining a two-dimensional translation matrix (dx, dy) and a scaling factor S between the eddy current image and the simulated eddy current image, using the corresponding pixels;

aligning the simulated eddy current image with the eddy current image using the two dimensional translation matrix (dx, dy) and scaling factor S; and linking a plurality of pixels on the eddy current image to a respective plurality of points on the three-dimensional model of the component.

15. The method of claim 1, wherein the three-dimensional model comprises a solid computer aided design (CAD) model.

16. A multi-modality inspection method comprising:

acquiring a plurality of inspection data sets corresponding to a plurality of inspection modalities for a component;

fusing the inspection data sets to form a fused data set; and mapping the fused data set onto a three-dimensional model of the component to generate a three-dimensional multi-modality inspection model for the component.

17. The multi-modality inspection method of claim 16, wherein the fusing step comprises:

performing at least one statistical analysis on the inspection data sets to determine a plurality of redundant data; and removing the redundant data from the inspection data sets to form the fused data set.

18. The multi-modality inspection method of claim 16, wherein the fusing step comprises removing a plurality of redundant data from one or more of the inspection data sets to form the fused data set, and wherein the removal is based on the relative accuracy of respective ones of the inspection modalities.

19. The multi-modality inspection method of claim 16, further comprising displaying the three-dimensional inspection model for the component.

20. The multi-modality inspection method of claim 16, further comprising using the three-dimensional inspection model for the component to modify at least one of (a) a design of the component and (b) a manufacturing process for the component.

21. The multi-modality inspection method of claim 16, wherein the three-dimensional model comprises a solid computer aided design (CAD) model.

* * * * *